March 4, 1947. O. WEISS 2,416,808
APPARATUS FOR MEASURING THE DENSITY OF LIQUIDS
Filed Jan. 20, 1944 2 Sheets-Sheet 1
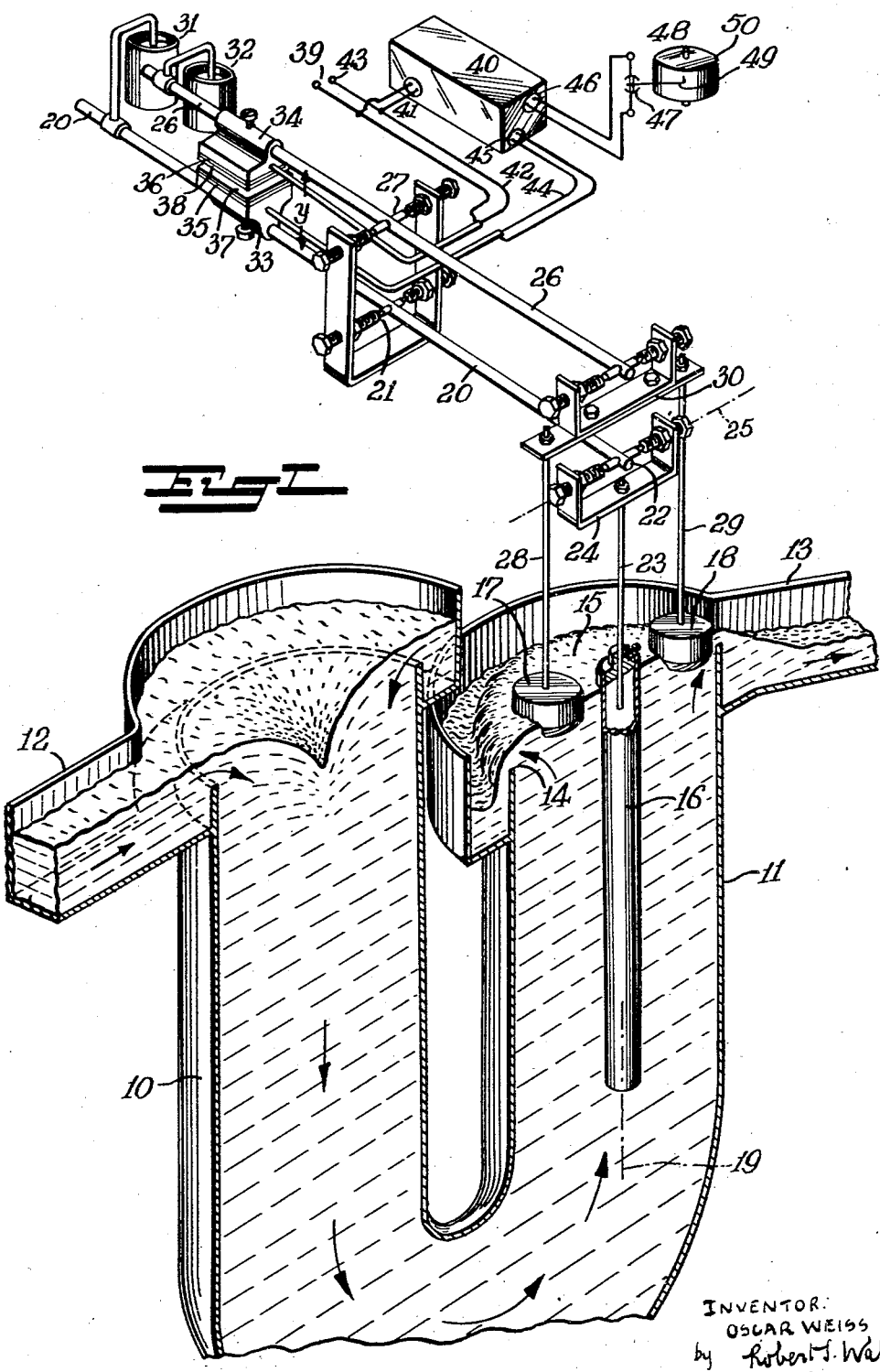
INVENTOR.
OSCAR WEISS
by Robert J. Waters
ATTORNEY.

March 4, 1947. O. WEISS 2,416,808
APPARATUS FOR MEASURING THE DENSITY OF LIQUIDS
Filed Jan. 20, 1944 2 Sheets-Sheet 2
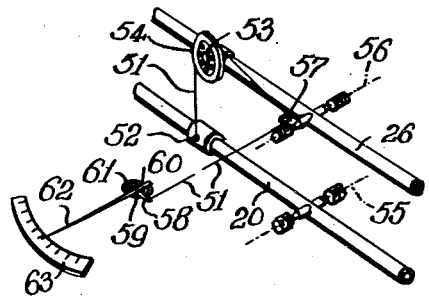
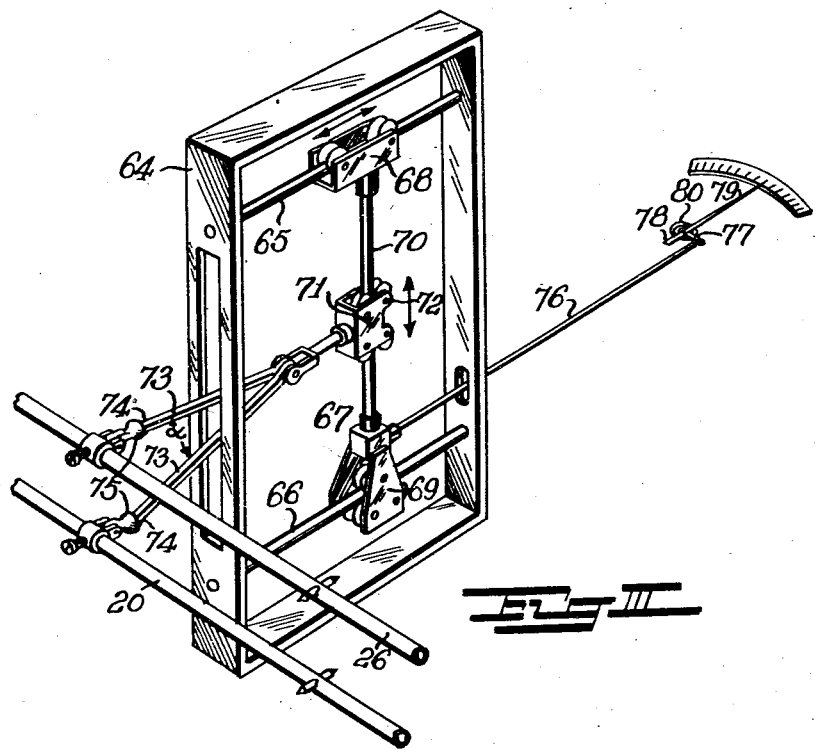
INVENTOR.
OSCAR WEISS
by Robert S. Waters
ATTORNEY.

Patented Mar. 4, 1947

2,416,808

UNITED STATES PATENT OFFICE 2,416,808

APPARATUS FOR MEASURING THE DENSITY OF LIQUIDS

Oscar Weiss, Johannesburg, Transvaal, Union of South Africa

Application January 20, 1944, Serial No. 518,944
In the Union of South Africa October 28, 1943

4 Claims. (Cl. 73—33)

This invention relates to measurement of the density of liquids by means including a hydrometer float. A particular utility is for measuring the density of liquid in flow; and features of the invention render it well adapted for dealing with non-homogeneous liquids.

A particular object of the invention is the continuous and automatic recording of the density measurement, or at least the indication of it at a distant station. In such cases it is practically a necessity that the recording or indicating mechanism shall be fixed in space; with the result that any variation of the height of the air-liquid surface in which the hydrometer floats becomes a problem to be dealt with, since it introduces variations of the float height, with reference to fixed parts, additional to those due to changes of density of the liquid.

Cases in which the density measurement has necessarily to be taken while the liquid is in flow, are that in which the flow is due to the needs of an industrial operation to which the liquid is being subjected, and that in which the liquid is kept in flow in order to maintain in suspension constituents that tend to settle out. Ore pulp in circuit in a metallurgical plant is an instance where both these conditions are present.

In the industrial operations mentioned, variation of rate of flow is to be expected; and such variations involve variation of the height, with reference to fixed parts, of the air-liquid surface at which the hydrometer floats.

The invention deals with this problem of variation of surface height by measuring the different immersion factors of two buoyant bodies floating in the same air-liquid surface of the liquid to be tested. The immersion factor means the magnitude of the rise or fall of a floating hydrometer consequent on a given change of density of the liquid. It is a function of the ratio of weight of the hydrometer to the horizontal cross sectional area of the hydrometer at the water line.

Considered from another aspect, the invention measures the height, with reference to fixed parts, of a hydrometer floating in said air-liquid surface, measures also the similar height of said surface and obtains the density of the liquid from the difference of said measurements.

More specifically it is an object of the invention to transmit to the stationary measuring device only those movements of the buoyant bodies which they execute relatively to each other owing to a change of the density of the liquid and irrespective and independent of any common movement which the buoyant bodies might execute owing to a change of the level of the air-liquid surface.

Measurement of the density of liquid in flow also raises a problem of another kind viz. that of presenting an air-liquid surface suitable for floating the hydrometer. The invention deals with this problem by flowing the liquid upwardly and causing it to overflow a horizontal rim, thereby providing a materially horizontal air-liquid surface at which the hydrometer means is floated.

An example of apparatus according to the invention is illustrated in the accompanying drawings in which Figure I is a perspective view partly sectioned and partly diagrammatic, of a densimeter suitable for continuously recording the density of metallurgical pulp flowing from a classifier.

Figure II shows a modification of the recording part of the apparatus.

Figure III shows an alternative construction of the recording part of the apparatus.

The apparatus comprises a U tube 10, 11 through which the pulp or other liquid to be tested is caused to flow continuously from a feeding launder 12 to a discharge launder 13 from which it is passed on for further treatment.

The pulp flowing up the upcast leg 11 of the U-tube overflows at the rim or lip 14 of the upper end thereof and so provides the materially horizontal pulp surface 15. Said leg shapes the stream to a cross sectional form which does not vary with variation of rate of flow. The flow, being upward, is directly opposed to the settling tendency of the solid particles of the pulp; consequently, the rate of flow being made sufficient to keep said particles in suspension, there is nothing to prevent the stream from being of uniform density over its whole cross section. By forming the tube as a U, the downcast leg 10 adds to the length available for shaping the stream and ensuring its stream-line flow; whilst providing a liquid-propelling head that is uniform apart from the small changes due to variation of the rate of flow. It also reduces to a minimum the loss of head required to bring about the upward flow.

It is at the surface 15 that the floats 16, 17, 18 forming part of the apparatus are provided. The float marked 16 is essentially an ordinary hydrometer float characterised by a high immersion factor due to its weight being considerable relatively to its cross sectional area; so that small changes of density of the liquid are reflected as substantial changes of its immersion in the surface 15.

The other two floats 17, 18, are functionally a single unit, structurally divided into two parts in order to be symmetrically positioned with respect to the axis 19 of the surface 15 since said surface is not quite level in the vertical cross section shown, although it is symmetrical with respect to said axis. Said two floats 17, 18 are identically shaped and their immersion factor is low in contrast to that of float 16; that is to say they are of large horizontal cross section relatively to their weight, so that their depth of immersion is very small as compared with that of the hydrometer float; and, being very small, is very little varied by changes of density of the liquid.

Accordingly all three floats 16, 17, and 18 are equally displaced vertically by whatever change occurs in the height of the surface 15 from time to time. A further component of the total vertical motion of the floats is imposed by change of the density of the pulp; so that by subtracting total vertical displacement of 17, 18 from simultaneous total vertical displacement of 16, the vertical displacement due to changes in the velocity of flow is eliminated and the remaining displacement is a linear function of density. If the immersion of 17, 18 is but slight, its variation is negligibly small and the result of the subtraction is a direct measure of the pulp density, like that given by the graduations of a simple free floating hydrometer.

The purpose of the rest of the apparatus to be described, is to measure said difference and to exhibit its value by means of stationary indicating or recording apparatus. Such apparatus includes a balance beam 20 pivoted at 21 for movement in a vertical plane. The hydrometer float 16 is connected to one end 22 of said beam through the medium of a light rod 23 attached to a hanger 24 pivoted to the beam at the horizontal axis 25. 26 is a second and similar balance beam the pivot axis 27 of which is vertically above the axis 21 of beam 20. The floats 17, 18 are attached to beam 26 by light rods 28, 29 and the hanger 30. 31, 32 are dashpots associated severally with the beams to moderate their rate of tilting. Each beam with all its parts, but with the exception of the floats 16, 17, 18, is somewhat precisely balanced by the mass 33 or 34 adjustable along it. The floats are made of sufficient size to provide the small amounts of power needed to operate the balance beams without themselves being materially displaced from their free floating positions. The constructional methods adopted in producing the apparatus are such as to minimize mass and friction.

As the result of this arrangement and provided the beams do not move far from the horizontal, change of level of the surface 15 appears as identical changes of angularity of both balance beams 20, 26. Change of density on the other hand appears as change of the angle between the two beams and consequently as change in the vertical distance between two points, one on each beam, each point being at the same radial distance from the pivot axis 21 or 27 of its beam and said points being vertically above one another.

Three means are shown responsive to change of distance between two such points. In the Figure I arrangement such two points are represented, with sufficient accuracy so long as the beams remain materially horizontal, by two condenser plates 35, 36 mounted respectively on the masses 33, 34 which are in this case made of insulating material. Said plates 35, 36 are covered by insulating plates 37, 38 to prevent their touching. A constant electrical potential derived from a source 39 and applied to condenser plate 36 induces a potential in plate 35 proportionate in magnitude to the distance separating the two plates. Said induced potential is amplified; and the amplified potential is used to control a recorder.

In the drawing 40 indicates a tube amplifier. The mains supply to said amplifier is shown at 41. One of the condenser plates, viz, 36, is connected by lead 42 to the unearthed mains terminal 43. The other plate 35 is connected by lead 44 to the input terminal 45 of the amplifier. Those portions of leads 42 and 44 which are close to one another are shown, as indicated by double lines, as being enclosed in earthed metal tubes so as to avoid any direct influence upon lead 44 of the input lead 42 which carries the full potential of 39. The earthed tubes are electrically insulated by any suitable means from the condenser plate 36 and 37. The portion of the mains voltage reaching 45 is made proportional to the capacity between the condenser plates, by keeping the input impedance of the amplifier 40 much lower than the impedance of the capacity of the condenser plates. The output 46 of the amplifier is connected to the coil 47 of any suitable electric recorder 48 and determines the position of a recording pen 49 on a time chart 50 the vertical dimensions of which represent values of specific gravity of the pulp. Variation of the distance between the condenser plates 35, 36 alters the magnitude of the induced potential and accordingly of the output of amplifier 40 resulting in the pen 49 moving to a new position.

In the modification shown in Figure II, one end of a flexible cord 51 is attached to an eye 52 on one beam for instance beam 20 and the cord is passed around the rim of a pulley 53 mounted on the other beam. Said eye 52 and the point 54 of the rim at which the cord passes on to the pulley 53 constitute the two points defined above as being vertically above one another and equally spaced from their respective beam axes 55, 56. Said cord 51 is also passed about a pulley 57 which is spaced a negligibly small distance from the axis 56 of beam 26, in the sense that displacement in space of said pulley 57 due to tilting of said beam 26 does not significantly alter the position in space of the second end 58 of the cord 51, which is led out from pulley 57, close to and parallel with the axis 56. Said cord end 58 is attached to the arm 59 of a pivoted member 60 to move the latter against a light restoring spring 61. Said member comprises an indicating or recording arm 62 working over a scale or chart 63.

An alternative mechanical arrangement is shown in Figure III. 64 is a frame positioned vertically and with its plane perpendicular to the plane in which the balance beams 20, 26 move. Said frame provides guides 65 and 66 on which a member 67 is free to slide horizontally with low frictional resistance due to the antifriction slippers 68, 69. Said member 67 provides a vertical guide 70 on which a carriage 71 is mounted for vertical movement, by means of the similar antifriction bearings 72.

Two equal links 73 are so pivoted to the carriage 71 that their ends 74 are free to separate and come together in the vertical direction. Said ends 74 are attached respectively to the balance beams 20 and 26 by ball joints 75. The carriage 71 is connected by a rod 76 to the actuating arm 77 of the pivoted member 78 which carries the indicating or recording arm 79 and is controlled by the spring 80.

Equal upward movements of the balance beams 20, 26 merely cause equal movement of the carriage 71 up or down the guide 70. Differential movement of the balance beams however causes alteration of the angle α between the links 73. This in turn causes horizontal displacement of the member 67, to or from the vertical plane in which the ends 74 of the links 73 work. The displacement is towards the balance if the balance beams separate, and away from the balance if the balance beams approach one another. This horizontal movement is transmitted by rod 76 to the actuating arm 77 of the indicating or recording device.

The movements of the pen 49 or the arm 62 may be calibrated against pulp flows of different densities; the values of which have been ascertained by other means. In an example of the apparatus constructed according to Figure I, the U-tube 10, 11 is ten inches in diameter and passes secondary classifier overflow at the rate of 40 tons per hour. Normal variation of density is between 1.07 and 1.12; under which the hydrometer float 16 rises or falls through a range of 1½ inches reckoned from the surface 15. Variations in the rate of flow of pulp are reflected as a range of 1 inch variation of the height of surface 15. By checking with systematically taken hand samples, the recorded density of the pulp is found to be correct within a margin of plus or minus 0.1 per cent.

I claim:

1. Hydrometer apparatus comprising means to present an air-liquid surface, a balance system comprising two buoyant bodies of different immersion factors to float on said surface and a pair of similar balance beams to which said bodies are severally connected, said balance system adapted to displace said balance beams about equal angles on changes of the level of said air-liquid surface and about differing angles on changes of the density of said liquid, a stationary measuring device and transmission means between said balance beams and said measuring device, said transmission means adapted to respond exclusively to the difference of said angular displacements but not to the angular displacements themselves.

2. The subject matter of claim 1 in which the bodies are substantially vertically below the beam ends to which they are connected, and the beam pivots are vertically one above the other, said transmission means including means to measure the vertical distance between similar points of the respective beams.

3. Apparatus for measuring the density of liquid, comprising means to define an air-liquid surface of the liquid, two means displaced equally by variation of the height of the liquid and displaced unequally in the same direction by variation of the density of the liquid, two arms of equal length pivoted about separate axes so that they are capable of angular movement parallel with one another, said arms being connected respectively to the two means to be displaced therewith, a flexible tensile member secured at one end to the end of one lever arm, means positioned respectively at the end of and near the pivot axis of the second arm for changing the direction of the flexible member, a movable measuring element, the flexible member being led around said direction changing means in succession and having its other end connected to said measuring element to move the latter, and resilient means for moving the measuring element in opposition to the pull of the flexible tensile member.

4. Apparatus for measuring the density of liquid, comprising means to define an air-liquid surface of the liquid, two means displaced equally by variation of the height of the liquid and displaced unequally in the same direction by variation of the density of the liquid, two balance beams of equal functional length pivoted about separate axes so that they are capable of angular movement parallel with one another, said beams being connected respectively to the two means so as to be displaced therewith, two links enclosing an angle between them and each having one end pivoted respectively to each of said beams, and lying in a plane perpendicular to the plane of movement of the beams, a member movable in both dimensions of the plane of said links, the other ends of the links being connected to said member to combine the movements of both beams in said member, means so associated with the member as to derive therefrom only its one dimensional movement in the direction perpendicular to the plane of movement of said beams, which is due to change of the angle between the links, and a movable measuring element actuated by such derived movement.

OSCAR WEISS.

REFERENCES CITED

The following references are of record in the file of this patent:

UNITED STATES PATENTS

| Number | Name | Date |
|---|---|---|
| Re. 17,728 | Burningham et al. | July 15, 1930 |
| 1,691,084 | Schwartz | Nov. 13, 1928 |
| 1,701,404 | Dennis | Feb. 5, 1929 |
| 1,787,132 | Van Orsdale | Dec. 30, 1930 |
| 1,788,465 | Lamar | Jan. 13, 1931 |
| 1,838,845 | Lanaux | Dec. 29, 1931 |
| 2,294,455 | Haultain | Sept. 1, 1942 |
| 1,431,638 | Dowling | Oct. 10, 1922 |
| 1,526,850 | Davis et al. | Feb. 17, 1925 |
| 1,071,167 | McDonald | Aug. 26, 1913 |
| 1,067,073 | Steiger | July 8, 1913 |
| 1,957,941 | Coe | May 8, 1934 |
| 2,211,748 | Devenish | Aug. 20, 1940 |

FOREIGN PATENTS

| Number | Country | Date |
|---|---|---|
| 166,431 | British | July 21, 1921 |
| 446,069 | British | Apr. 23, 1936 |
| 64,514 | German | Sept. 19, 1892 |
| 630,435 | German | May 28, 1936 |
| 667,829 | French | June 25, 1929 |
| 690,716 | French | June 24, 1930 |